(12) United States Patent
Weatherly, Sr. et al.

(10) Patent No.: US 7,854,183 B2
(45) Date of Patent: *Dec. 21, 2010

(54) SWAGE ANVIL FOR A SAWBLADE SWAGE ASSEMBLY

(75) Inventors: James S. Weatherly, Sr., Scappoose, OR (US); Gregory S. Richardson, Estacada, OR (US); Paul Gardner, Vancouver, WA (US); Norman Andrew Brown, Kalama, WA (US); Marc Elkins, Washougal, WA (US); Roy Erdwins, Washougal, WA (US); Robert L. Woods, Mulino, OR (US)

(73) Assignee: Simonds Industries, Inc., Fitchburg, MA (US)

( * ) Notice: Subject to any disclaimer, the term of this patent is extended or adjusted under 35 U.S.C. 154(b) by 318 days.

This patent is subject to a terminal disclaimer.

(21) Appl. No.: 11/731,671

(22) Filed: Mar. 30, 2007

(65) Prior Publication Data

US 2008/0236340 A1 Oct. 2, 2008

(51) Int. Cl.
*B23D 63/06* (2006.01)
(52) U.S. Cl. ............... 76/51; 76/53; 76/54; 76/57
(58) Field of Classification Search ............. 75/51–57
See application file for complete search history.

(56) References Cited

U.S. PATENT DOCUMENTS

| | | | | | |
|---|---|---|---|---|---|
| 279,251 | A | * | 6/1883 | Kelly | 76/56 |
| 312,061 | A | * | 2/1885 | Young | 76/54 |
| 354,114 | A | * | 12/1886 | Emerson | 76/54 |
| 415,614 | A | * | 11/1889 | Campbell | 76/54 |
| 425,895 | A | * | 4/1890 | Milford | 76/54 |
| 608,494 | A | * | 8/1898 | Walker | 76/54 |
| 642,896 | A | * | 2/1900 | Crowell | 76/54 |
| 653,824 | A | * | 7/1900 | Shortridge et al. | 76/54 |
| 747,094 | A | * | 12/1903 | Smith | 76/54 |
| 762,195 | A | * | 6/1904 | Renie | 76/54 |

(Continued)

OTHER PUBLICATIONS

AutoSwage Datasheet, "Armstrong's AutoSwage Automatic Band Saw Swage and Shaper," retrieved from the internet on Jan. 12, 2007 (http://www.armstrongblue.com/New_Products/AutoSwageDataSheet.htm), 2004, 2 pages.

(Continued)

*Primary Examiner*—Jason Daniel Prone
(74) *Attorney, Agent, or Firm*—BainwoodHuang

(57) ABSTRACT

A swage anvil includes a coupling portion that, when mated with a corresponding die of a swaging device, allows lateral positioning of the swage anvil (i.e., substantially parallel to a long axis of the saw blade) relative to the long axis of the saw blade. The swage anvil also includes a tooth contact face that substantially mirrors an angle of the back portion of each tooth of the saw blade. As such, after a manufacturer inserts the swage anvil into the swage device and laterally translates the swage anvil, the tooth contact face abuts the back portion of the saw blade tooth to support the tooth during a swaging procedure. With the aforementioned configuration of the swage anvil, translation of the swage anvil along a single axis provides support to the back portion of the saw blade tooth along two axes. As such, use of the swage anvil decreases the set-up time required in conventional swaging devices.

15 Claims, 9 Drawing Sheets

U.S. PATENT DOCUMENTS

| | | | | |
|---|---|---|---|---|
| 818,179 | A * | 4/1906 | Lipsey | 76/54 |
| 905,989 | A * | 12/1908 | Coyle | 76/54 |
| 909,295 | A * | 1/1909 | Hedstrom | 76/54 |
| 972,599 | A * | 10/1910 | Caverno | 76/54 |
| 983,427 | A * | 2/1911 | Carroll | 76/54 |
| 1,021,284 | A * | 3/1912 | White | 76/54 |
| 1,045,078 | A * | 11/1912 | Proctor | 76/54 |
| 1,084,602 | A * | 1/1914 | Bowman | 76/54 |
| 1,089,313 | A * | 3/1914 | Breeze | 76/54 |
| 1,173,509 | A * | 2/1916 | Hedstrom | 76/54 |
| 1,486,157 | A * | 3/1924 | Olson | 76/52 |
| 1,492,152 | A * | 4/1924 | Armstrong | 76/54 |
| 1,557,090 | A * | 10/1925 | Ricker | 76/54 |
| 1,657,735 | A * | 1/1928 | Armstrong | 76/54 |
| 1,856,034 | A * | 4/1932 | Taylor | 76/53 |
| 1,863,910 | A | 6/1932 | Morey | |
| 1,905,013 | A * | 4/1933 | Taylor | 76/54 |
| 1,915,225 | A * | 6/1933 | Gommel | 76/54 |
| 1,943,863 | A * | 1/1934 | Gommel | 76/54 |
| 2,097,659 | A * | 11/1937 | Ferrari et al. | 76/54 |
| 2,190,920 | A * | 2/1940 | Hanchett | 76/54 |
| 2,451,759 | A * | 10/1948 | Maurer | 76/53 |
| 2,800,039 | A | 7/1957 | Vollmer | 76/54 |
| 2,865,234 | A * | 12/1958 | Kaiser | 76/54 |
| 2,985,039 | A * | 5/1961 | Kivimaa | 76/54 |
| 3,416,394 | A | 12/1968 | Stier et al. | |
| 3,496,804 | A | 2/1970 | Heitzman | |
| 4,133,226 | A * | 1/1979 | Torch | 76/56 |
| 4,331,047 | A | 5/1982 | English | |
| 4,426,894 | A | 1/1984 | Nicolodi | 76/54 |
| 4,578,984 | A * | 4/1986 | Bohman | 76/51 |
| 2008/0236339 | A1 * | 10/2008 | Weatherly et al. | 76/57 |

OTHER PUBLICATIONS

Armstrong Precision Swages Data Sheet, "Armstrong Swages for Band, Circular and Sash Gang Saws," retrieved from the internet on Jan. 18, 2007 (http://www.armstrongblue.com/swages/swagesdatasheet.htm), 2 pages.

Armstrong Air Swages Tool Adjustment Operating Instructions Datasheet, "Armstrong Air Swages Tool Adjustment Operating Instructions," retrieved from the internet on Jan. 18, 2007 (http://www.armstrongblue.com/Swages/AirSwageOperDatasheet.htm), 3 pages.

\* cited by examiner

SWAGE ANVIL FOR A SAWBLADE SWAGE ASSEMBLY

BACKGROUND

It is well known to use a saw blade, such as a bandsaw blade, to cut materials to a desired size. During cutting, material is removed from a work piece by a series of teeth formed into one or both edges of a steel strip or saw blade body which makes up the saw blade. For conventional saw blades, the teeth are manufactured such that, during operation, as the teeth pass through and remove material form the work piece, the teeth create a slot or kerf that is wider than a thickness of the saw blade. The kerf formed in the work piece allows passage of the saw blade body through the work piece during operation and minimizes saw blade binding.

The teeth of a conventional saw blade can be manufactured and arranged in various ways to ensure the generation of the kerf in a work piece during operation. In one process of saw blade manufacturing, saw blade teeth undergo a swaging procedure to widen a face portion of each tooth.

Swaging is a cold-working process in which a metal material is plastically deformed under high-pressure into a particular shape. Conventional swaging mechanisms include an anvil, such as disposed in a holder or swage head, an eccentric die, and a set of clamps, such as clamp screws. During use, a manufacturer positions a saw blade within the swaging mechanism such that a tooth to be swaged is disposed between the anvil and the die. The manufacturer actuates a pair of clamp screws disposed on opposing sides of the saw in order to secure the saw within the swaging mechanism. Next, the manufacturer adjusts the position of the anvil and the swage head such that the anvil abuts a back portion of the tooth. The anvil acts as a physical support for the tooth during the swaging process. Next, the manufacturer actuates the eccentric die which causing the die to rotate against the front portion of the tooth. This rotation flares the material of the front portion of the tooth toward either side of a centerline of the saw blade to widen the tooth relative to the saw blade body. The manufacturer then repositions the swaging mechanism relative to the next tooth to be swaged and repeats the process.

SUMMARY

While the anvil provides physical support for a saw blade tooth during a swaging process, a manufacturer can spend a relatively large amount of time to properly adjust the positioning of the anvil relative to the saw blade tooth prior to swaging. For example, as illustrated in the conventional swaging mechanism 1 of FIG. 1, an anvil 2 is held within a swage head 3. In order to provide adequate contact between a back portion 4 of a saw blade tooth 5 and the anvil 2, the manufacturer must adjust the substantially lateral, linear position 6 of the anvil 2 within the swage head 3 and the rotational position 7 of the swage head 3 relative to the saw blade tooth 5. For example, the anvil 2 is supported in the swage head 3 by a set screw 8. To adjust the position of the anvil 2 such that the anvil 2 abuts the back portion 4 of the tooth 5, the manufacturer loosens the set screw 8 to laterally displace the anvil 2 along direction 6 relative to the back portion 4 of the tooth 5. When a portion of the anvil 2 contacts the back portion 4 of the tooth 5, the manufacturer secures the anvil 2 within the swage head 3 via the set screw 8 and visually inspects the interface between the anvil 2 and the back portion 4 of the tooth 5. If the manufacturer observes a gap between either the front end or the back end of the anvil 2 and the back portion 4 of the tooth 5, the manufacturer loosens the swage head 3 within the swaging mechanism 1 and adjusts the rotational position 7 of the swage head 3 relative to the saw blade tooth 5 until the back portion 4 of the tooth 5 and the anvil 2 (e.g., the anvil face opposing the back portion 4 of a saw blade tooth 5) are substantially parallel. After securing the swage head 3 within the swaging mechanism 1, the manufacturer repeats the process in an iterative manner until the anvil 3 abuts the back portion 4 of the tooth 5. Such an iterative process can consume a relatively large amount of set-up time for each saw blade tooth 5 which adds to the overall manufacturing cost of the saw blade. Additionally, failure of the manufacturer to properly position the anvil 2 to abut the back portion 4 of the tooth 5 can potentially cause damage of the tooth 5 during the swaging procedure. For example, if the back portion 4 of the tooth 5 is not supported by the anvil 2 (e.g., a gap is present between the anvil 2 and the back portion 4 of the tooth 5) when an eccentric die 9 applies pressure to a front portion of the tooth 5, the pressure can bend the tooth 5 backward (e.g., toward the right of FIG. 1), thereby damaging the tooth 5. As a result, the entire saw blade must be reworked.

By contrast to conventional swaging apparatuses, embodiments of the present invention relate to a swage anvil for a saw blade swage assembly. The swage anvil includes a coupling portion that, when mated with a corresponding die of a swaging device, allows lateral positioning of the swage anvil (i.e., substantially parallel to a long axis of the saw blade) relative to the long axis of the saw blade. The swage anvil also includes a tooth contact face that substantially mirrors an angle of a top rear surface of each tooth of the saw blade. As such, after a manufacturer inserts the swage anvil into the swage device and laterally translates the swage anvil, the tooth contact face abuts the top rear surface of the saw blade tooth to support the tooth during a swaging procedure. With the aforementioned configuration of the swage anvil, translation of the swage anvil along a single axis provides support to the top rear surface of the saw blade tooth along two axes. As such, use of the swage anvil decreases the set-up time required in conventional swaging devices.

In one arrangement, a swage anvil includes an elongate body having a first end, a second end, and a coupling portion disposed between the first end and the second end. The coupling portion is configured to couple to a swage device to allow lateral movement of the swage anvil relative to a long axis of a saw blade carried by the swage device. The elongate body and the coupling portion define a tooth contact face extending between the first end and the second end. The tooth contact face defines an angle relative to a coupling portion surface of the elongate body, the angle of the contact face corresponding to an angle defined by a top rear surface of a tooth of the saw blade and relative to the long axis of the saw blade such that the tooth contact face abuts the top rear surface of the tooth.

In one arrangement a swage device includes a frame and a swage anvil coupled to the frame. The swage anvil includes an elongate body having a first end, a second end, and a coupling portion disposed between the first end and the second end. The coupling portion is configured to couple to the swage device to allow lateral movement of the swage anvil relative to a long axis of a saw blade carried by the swage device. The elongate body and the coupling portion define a tooth contact face extending between the first end and the second end. The tooth contact face defines an angle relative to a long axis of the elongate body, the angle of the contact face corresponding to an angle defined by a top rear surface of a tooth of the saw blade and relative to the long axis of the saw blade such that the tooth contact face abuts the top rear surface of the tooth.

BRIEF DESCRIPTION OF THE DRAWINGS

The foregoing and other objects, features and advantages will be apparent from the following description of particular embodiments of the invention, as illustrated in the accompanying drawings in which like reference characters refer to the same parts throughout the different views. The drawings are not necessarily to scale, emphasis instead being placed upon illustrating the principles of various embodiments of the invention.

DETAILED DESCRIPTION

Embodiments of the present invention relate to a swage anvil for a saw blade swage assembly. The swage anvil includes a coupling portion that, when mated with a corresponding die of a swaging device, allows lateral positioning of the swage anvil (i.e., substantially parallel to a long axis of the saw blade) relative to the long axis of the saw blade. The swage anvil also includes a tooth contact face that substantially mirrors an angle of a top rear surface of each tooth of the saw blade. As such, after a manufacturer inserts the swage anvil into the swage device and laterally translates the swage anvil, the tooth contact face abuts the top rear surface of the saw blade tooth to support the tooth during a swaging procedure. With the aforementioned configuration of the swage anvil, translation of the swage anvil along a single axis provides support to the top rear surface of the saw blade tooth along two axes. As such, use of the swage anvil decreases the set-up time required in conventional swaging devices.

Figure 1:
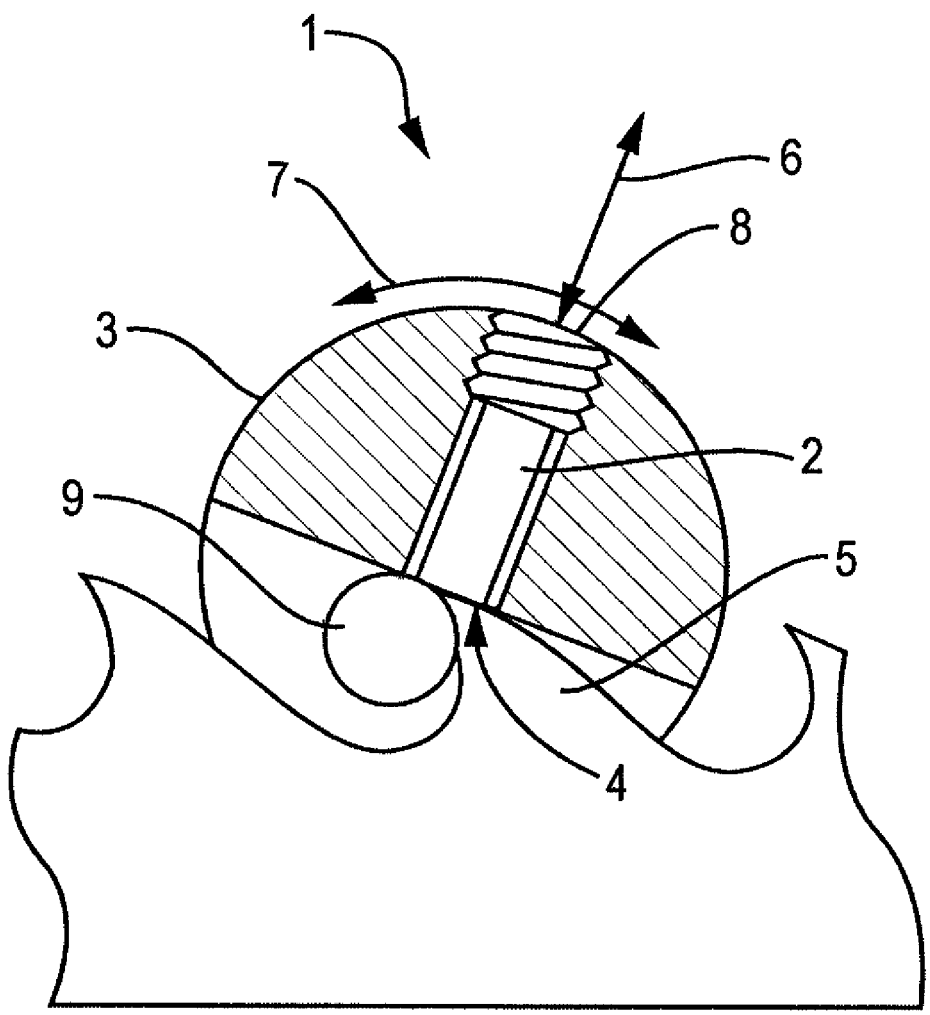
FIG. 1 illustrates an anvil and die assembly as used in conventional swaging mechanism.
Figure 2A:
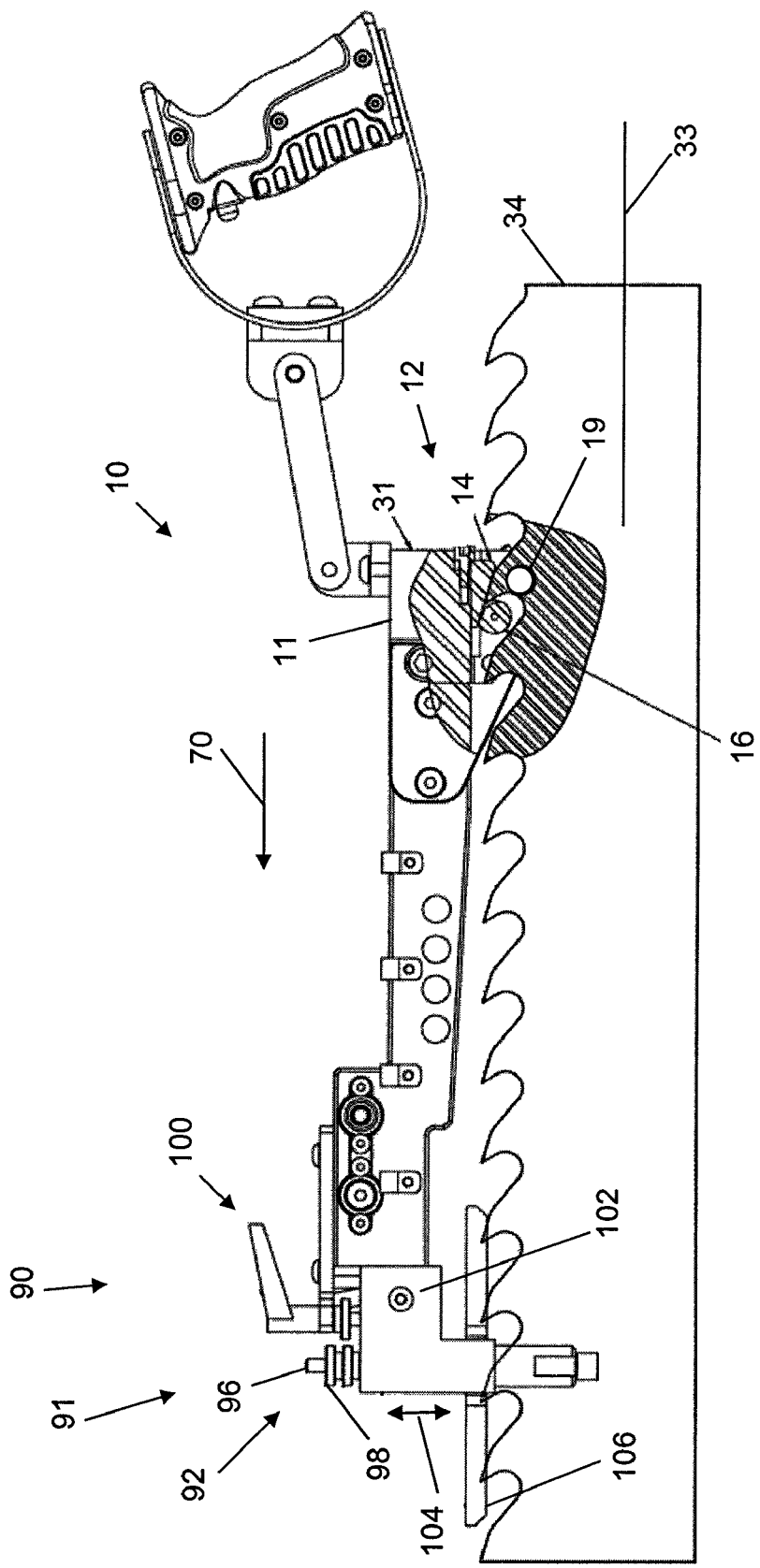
FIG. 2A illustrates a swage assembly having a swage anvil, according to one embodiment.
Figure 2B:
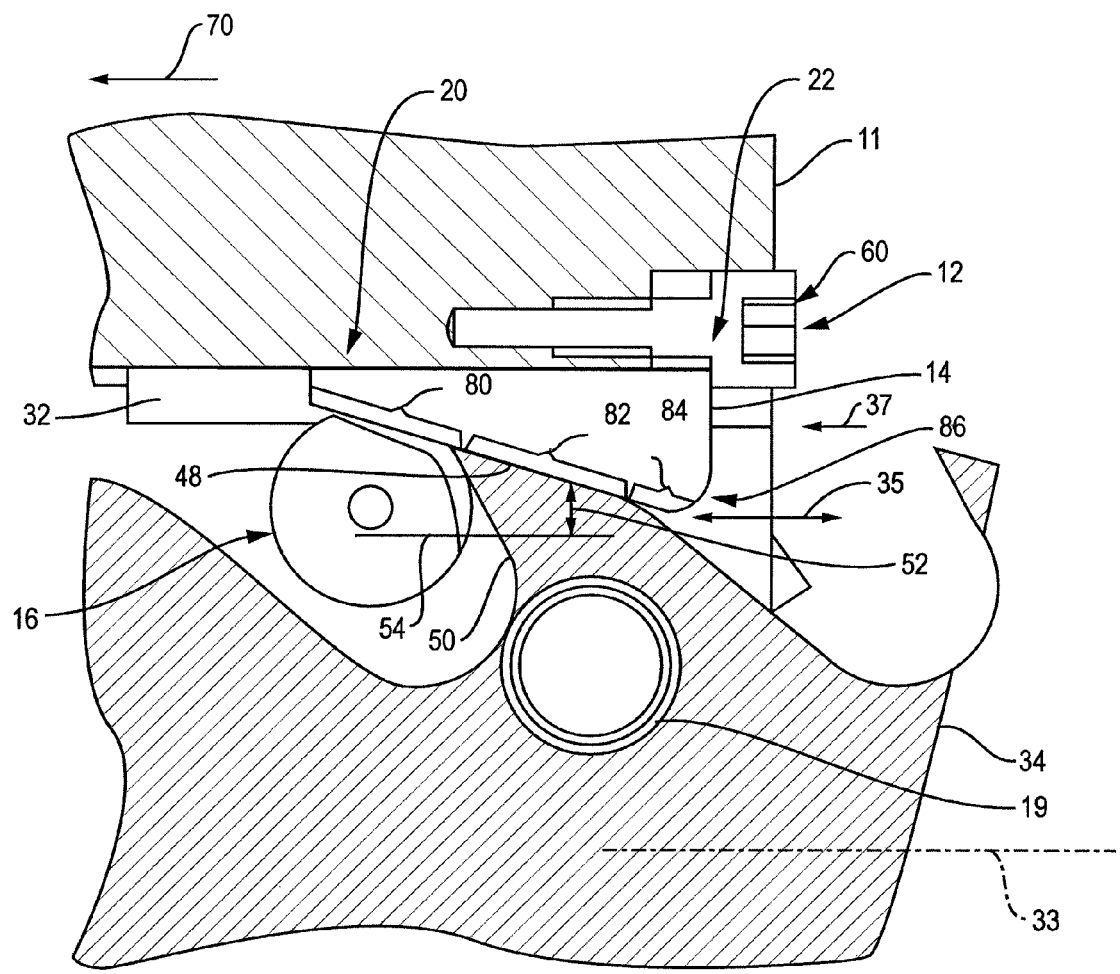
FIG. 2B illustrates a side view of the swage anvil disposed within the swage assembly of FIG. 2A.

FIGS. 2A and 2B illustrate an example of a swage device 10 having a frame 11 and a swage assembly 12 coupled to the frame 11. The swage assembly 12 includes a swage anvil 14, an eccentric die 16, and a set of clamps 19. The swage anvil 14 is configured to support a saw blade tooth 50 during a swaging process. A description of the swage anvil 14 is provided with respect to FIGS. 3 through 8.

FIGS. 3 through 8 illustrate an arrangement of the swage anvil 14 of FIGS. 2A and 2B. The swage anvil 14 is formed of an elongate body 18 having a first end 20 and a second end 22. While the elongate body 18 of the swage anvil 14 can be manufactured from a variety of materials, in one arrangement, the elongate body 18 is formed from a steel, cobalt chromium, or carbide material.

Figure 3:
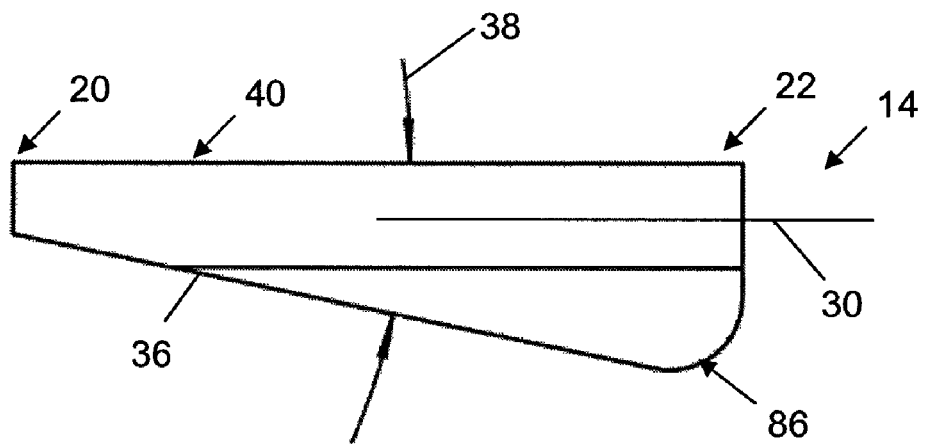
FIG. 3 illustrates a side view of the swage anvil of FIG. 2A.
Figure 5:
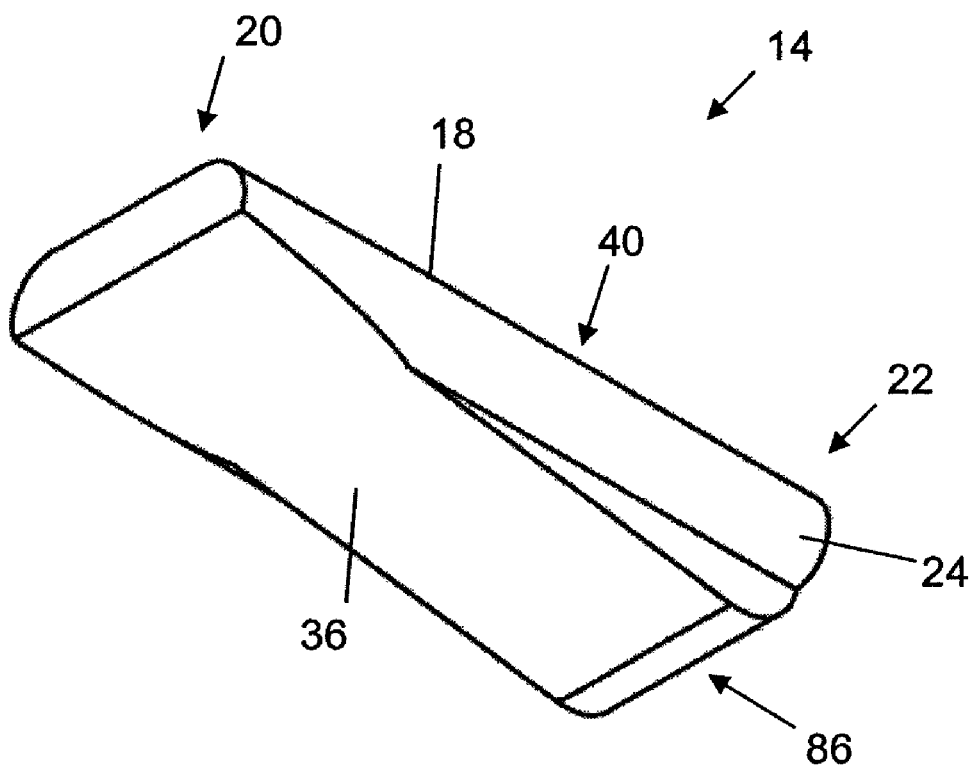
FIG. 5 illustrates a bottom perspective view of the swage anvil of FIG. 2A.
Figure 6:
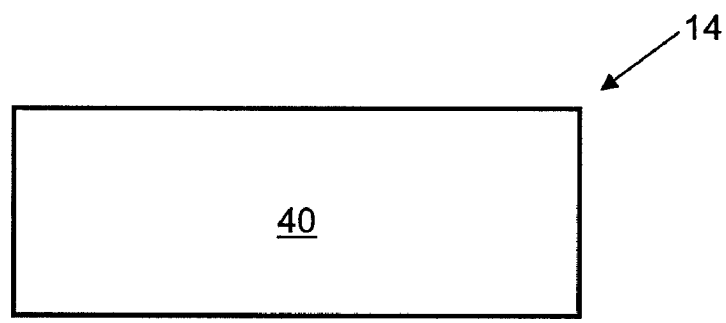
FIG. 6 illustrates a top view of the swage anvil of FIG. 2A.
Figure 7:
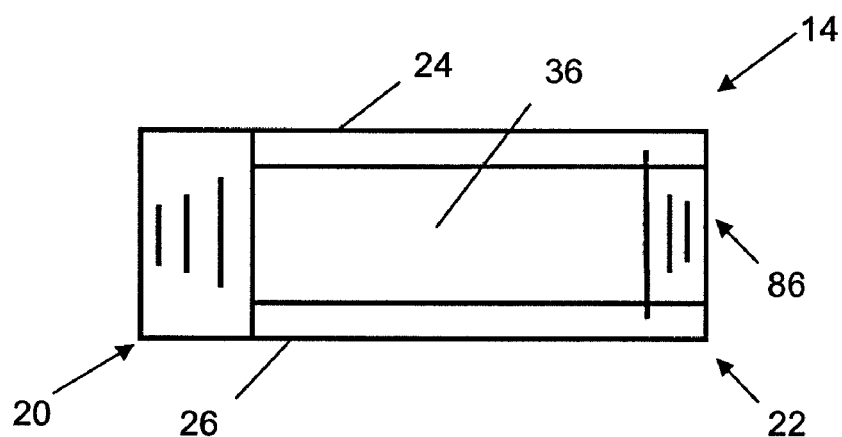
FIG. 7 illustrates a bottom view of the swage anvil of FIG. 2A.
Figure 8:
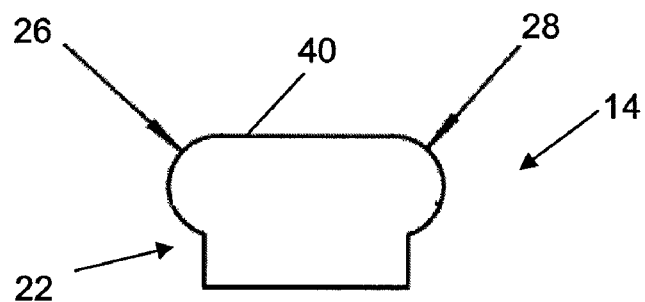
FIG. 8 is a rear view of the swage anvil of FIG. 2A.
Figure 9A:
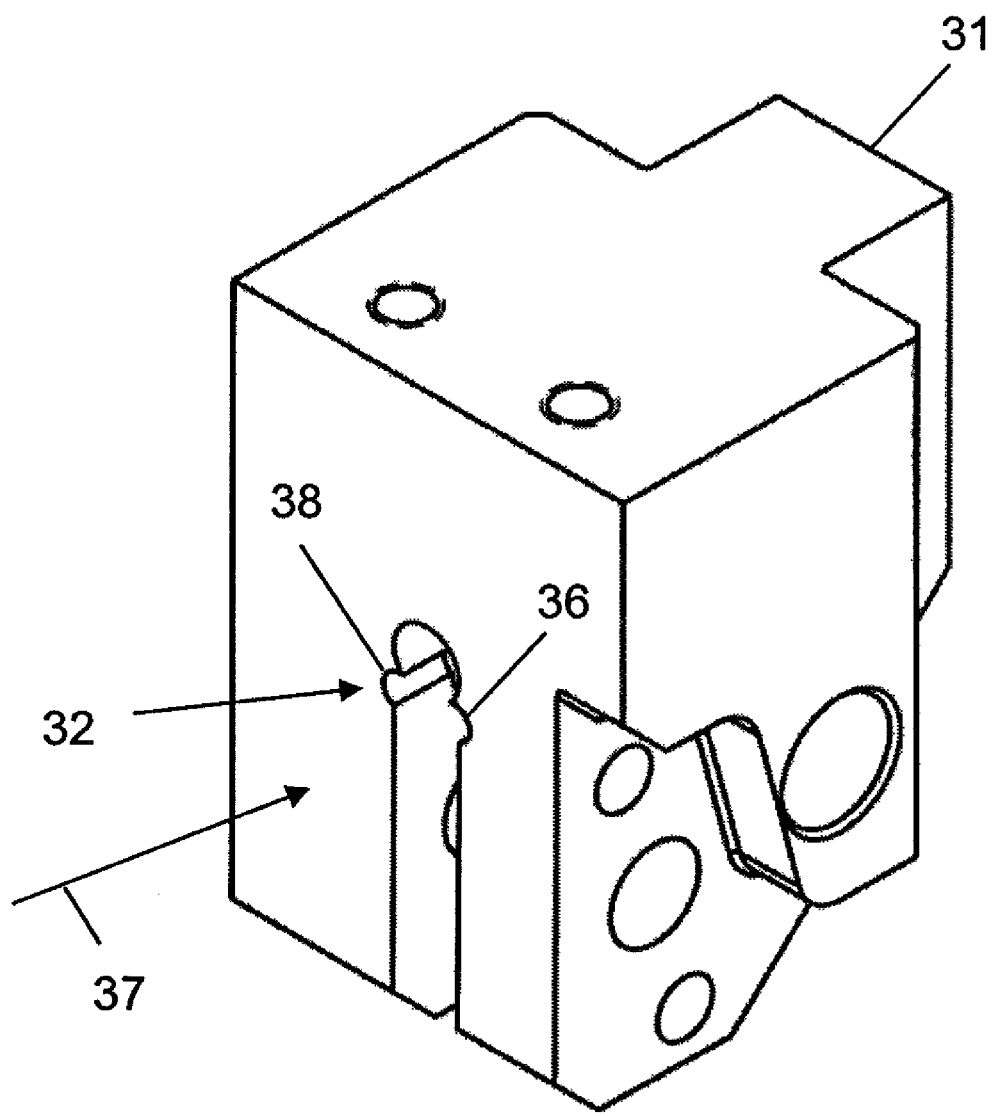
FIG. 9A illustrates a perspective view of a die of FIG. 2A.
Figure 9B:
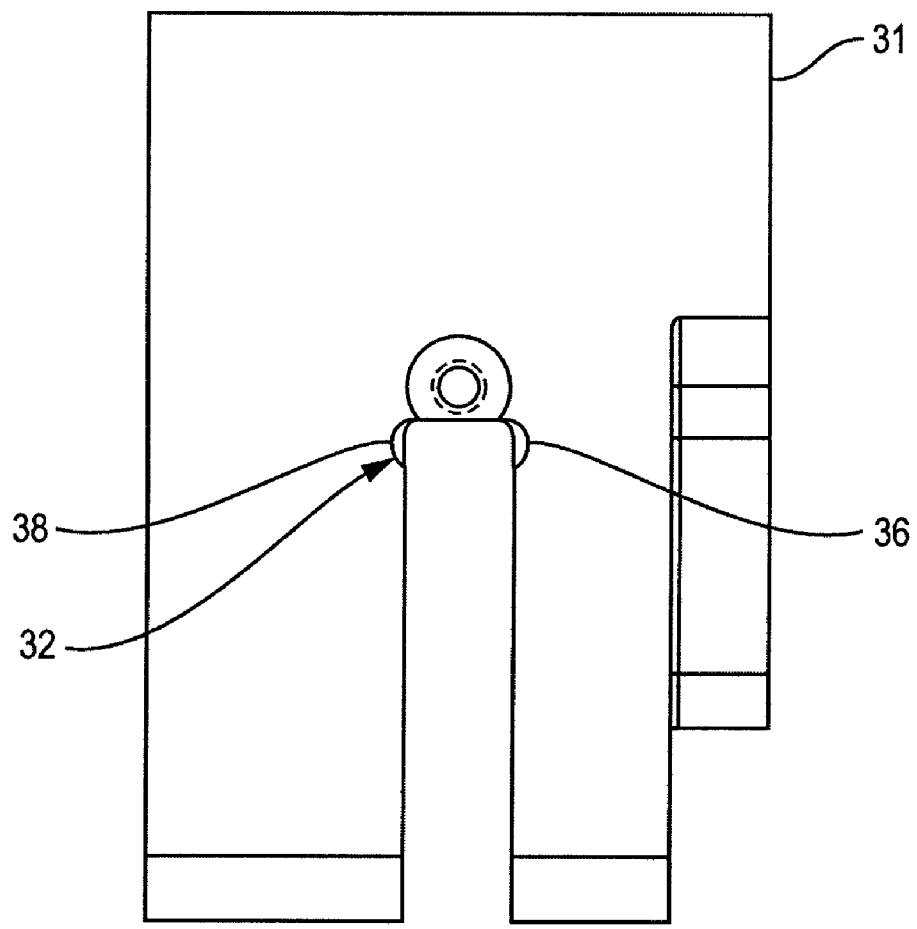
FIG. 9B illustrates a rear view of the die of FIG. 9A.
Figure 9C:
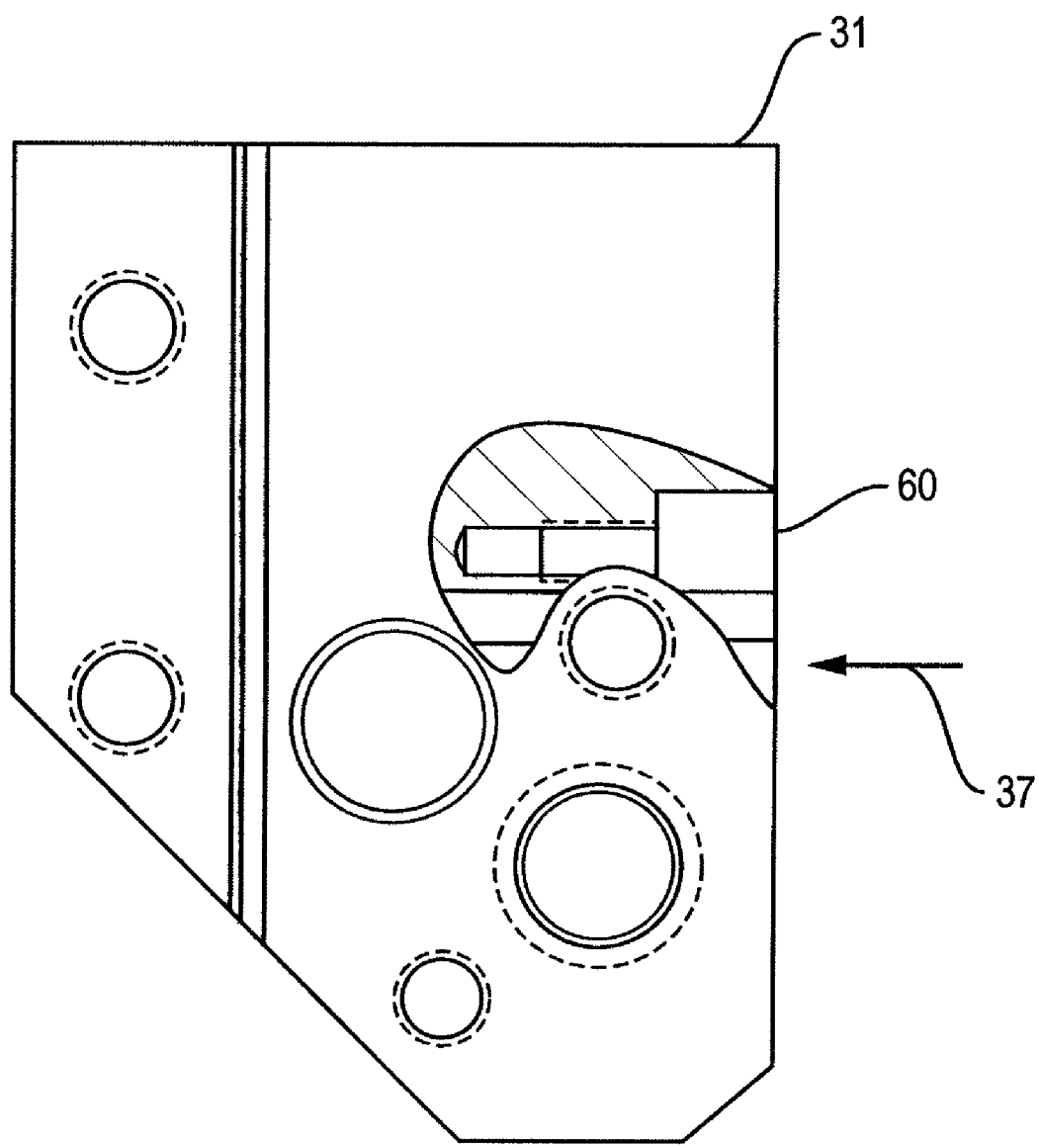
FIG. 9C illustrates a side view of the die of FIG. 9A.

With reference to FIGS. 3, 5 and 7, the swage anvil 14 defines a tooth contact face 36 that extends between the first end 20 and the second end 22 of the elongate body 18. The tooth contact face 36 is configured to abut a top rear surface 48 of the saw blade tooth 50, such as illustrated in FIG. 2B, to support the tooth 50 during a swaging procedure. For example, taking FIG. 2B in conjunction with FIGS. 3, 5 and 7, in order to provide contact between the tooth contact face 36 and the top rear surface 48 of the saw blade tooth 50, the tooth contact face 36 defines an angle 38 relative to an upper coupling portion surface 40 of the swage anvil 14. The angle 38 of the contact face 36 corresponds to (e.g., mirrors) an angle 52 defined by the top rear surface 48 of the saw blade tooth 50 relative to a horizontal reference 54 which extends along, and is substantially parallel to, a longitudinal axis 33 of a saw blade 34. With such a correspondence between the angle 38 of the contact face 36 and the angle 52 defined by the top rear surface 48 of the saw blade tooth 50, the tooth contact face 36 can abut the top rear surface 48 of a saw blade tooth 50 via a lateral translation of the swage anvil 14 along a direction that is substantially parallel to the long axis 33 of the saw blade 34.

While the angle 38 of the contact face 36 can be formed at a variety of angles of inclination, in one arrangement, the angle 38 of the contact face 36 is formed having an angle of between about 8° and about 16° relative to the upper coupling portion surface 40 of the swage anvil 14. Conventionally, the top rear surface 48 of each tooth 50 of a saw blade 34 defines an angle 52 of between about 8° and about 16° relative to the long axis 52 of the saw blade 34. As such, with the angle 38 of the contact face 36 formed as having an angle of between about 8° and about 16°, when a manufacturer inserts the swage anvil 14 into the swage device 10 and laterally translates the swage anvil 14, the tooth contact face 36 abuts the top rear surface 48 of the saw blade tooth 50 to support the tooth 50 during a swaging procedure. With such a configuration of the swage anvil 14, translation of the swage anvil 14 along a single axis provides support to the top rear surface 48 of the saw blade tooth 50 along two axes (e.g., an x-axis and a y-axis).

Figure 4:
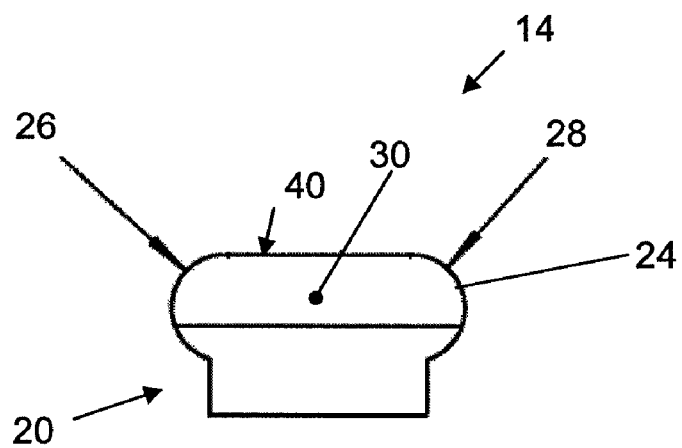
FIG. 4 illustrates a front view of the swage anvil of FIG. 2A.

As shown in FIGS. 3-5, the swage anvil 14 also includes a coupling portion 24 that extends between the first end 20 and the second end 22 of the elongate body 18. When inserted within the frame 11, as shown in FIGS. 2A and 2B, interaction between the coupling portion 24 of the swage anvil 14 and the frame 11 constrains movement of the swage anvil 14 to a substantially lateral movement 35 substantially parallel to the long axis 33 of the saw blade 34 carried by the swage device 10. In one arrangement, as best shown in FIG. 4, the swage anvil 14 includes a pair of coupling portions, such as a first lobe 26 and a second lobe 28, that extend in opposing directions from a centerline 30 of the swage anvil 14. The frame 11 in turn defines a slot 32 into which the coupling portion 24 of the swage anvil 14 is inserted. In one arrangement, as illustrated in FIG. 2A and FIGS. 9A through 9C, the frame 11 includes a swage head or die 31 having the slot 32 sized and shaped to mirror the size and shape of the coupling portion 24 of the anvil 14. For example, the slot 32 includes a first slot portion 36 that mirrors or corresponds to the first lobe 26 of the swage anvil 14 and a second slot portion 38 that mirrors or corresponds to the second lobe 28 of the swage anvil 14. As the anvil 14 is inserted within the slot 32 of the die 31 along direction 37, the first lobe 26 is disposed within the first slot portion 36 and the second lobe 26 is disposed within the second slot portion 38. As indicated in FIG. 2B, interaction between the swage anvil 14 and the slot 32 limits motion of the swage anvil 14 to motion along the lateral direction 35 relative to the saw blade 34.

Use of the swage anvil 14 within the swage device 10 minimizes the amount of time required to swage a saw blade tooth 50 during a swaging procedure. For example, with reference to FIG. 2B, at the start of a swaging procedure, a manufacturer first determines the angle 52 of the saw blade tooth 50 and inserts, into the slot 32, a swage anvil 14 having a tooth contact face 36 defining a substantially equivalent angle of inclination 38. For example, assume the back portion 48 of the saw blade tooth 50 forms an angle of about 8° relative to the long axis 33 of the saw blade 34. In such a case, the manufacturer selects a swage anvil 14 having a contact face 36 that forms an angle of about 8° relative to the upper surface 40 of the swage anvil 14.

The manufacturer then inserts the swage anvil 14 into the swage device 10 such that the coupling portion 24 engages the correspondingly shaped slot 32. The manufacturer utilizes an adjustment mechanism 60, such as a screw to slide the swage anvil 14 along the lateral direction 37 until the contact face 36 abuts the top rear surface 48 of the saw blade tooth 50. The manufacturer then secures the swage anvil 14 within the swage device 10 using the adjustment mechanism 60 to minimize translation of the swage anvil 14 along a direction opposing direction 37. Because the manufacturer selected the swage anvil 14 as having a tooth contact face 36 defining a substantially equivalent angle of inclination 38 as the top rear surface 48 of the saw blade tooth 50, as the contact face 36 contacts the top rear surface 48 of the saw blade tooth 50, the swage anvil 14 provides adequate support for the saw blade tooth 50 during the swaging procedure.

With reference to FIGS. 2A and 2B, after a manufacturer has completed a swaging procedure on one tooth 50, the manufacturer advances the swage assembly 12 to a subsequent tooth by physically moving the swage device 10 along direction 70. As the manufacturer advances the swage device 10, the contact face 36 of the swage anvil slides across the top rear surface 48 of the saw blade tooth 50. As the second end 22 of the swage anvil 14 is advanced past the tip of the saw blade tooth 50, the swage anvil 14 falls or drops onto the subsequent tooth. In certain cases, however, the length of the top rear surface 48 of each saw blade tooth 50 can vary. In one arrangement, in order to ensure adequate contact between the swage anvil 14 and each tooth 50 of the saw blade 34, the swage anvil 14 is configured such that the contact face 36 of the swage anvil 14 is longer than a length of the top rear surface 48 of each tooth 50 of the saw blade 34. For example, as illustrated in FIG. 2B, the tooth contact face 36 defines a tip overhang portion 80 that extends beyond a tip of the tooth 50, a tooth abutment portion 82 that contacts the top rear surface 48 of the tooth 50, and a rear overhang portion 84 that extends beyond a top rear surface 48 of the tooth 50 and over a bottom rear surface of the tooth 50. This configuration of the swage anvil 14 ensures that, in the case where the length of the top rear surface 48 of each tooth is variable in a saw blade 34, the swage anvil 14 can provides adequate support for the saw blade tooth 50 during a swaging procedure. Additionally, the extended length of the swage anvil 14 provides an adequate "landing zone" for the swage anvil 14 as it is advanced over a saw blade 34. For example, as the manufacturer physically advances the swage device 10 relative to the saw blade 34 which causes the swage anvil 14 to slide across the top rear surface 48 of one tooth of the saw blade and land on the top rear surface of a subsequent tooth. The extended length of the swage anvil 14 helps to evenly distribute the landing impact of the swage anvil 14 across the entire length of the top rear surface 48 of each tooth 50.

As indicated above, as the swage anvil 14 is advanced over the saw blade 34 from a first tooth to a subsequently positioned second tooth, the contact face 36 of the swage anvil slides across the back portion 48 of the saw blade tooth 50 and the swage anvil 14 falls or drops onto the second, subsequent tooth. In one arrangement, the swage anvil 14 is configured to allow a relatively smooth movement and repositioning of the swage anvil 14 between adjacent teeth 50 of the saw blade 34. For example, with reference to FIG. 2B the rear overhang portion 84 defines a substantially curved portion 86 that extends beyond a rear portion (e.g., the back portion) of the tooth 50. As the manufacturer advances the swage device 10, as the second end 22 of the swage anvil 14 is advanced past the tip of the saw blade tooth 50, the curved portion 86 of the swage anvil 14 rides over the tip of the tooth 50 as the swage anvil 14 falls or drops onto the subsequent tooth. As such, the curved portion 86 of the swage anvil 14 minimizes interference between the swage anvil 14 and the teeth 50 of the saw blade 34 as the swage device 10 is advanced from tooth to tooth.

While various embodiments of the invention have been particularly shown and described, it will be understood by those skilled in the art that various changes in form and details may be made therein without departing from the spirit and scope of the invention as defined by the appended claims.

For example, as indicated above, the swage anvil 14 includes a coupling portion 24, such as a first rounded lobe 26 and a second rounded lobe 28, that extend in opposing directions from the centerline 30 of the swage anvil 14. Such description is by way of example only. In one arrangement, the coupling portion 24 can be configured in any shape. For example, the coupling portion 24 can include square, rectangular, or dovetail shaped portions that extend in opposing directions from the centerline 30 of the swage anvil 14. In such an arrangement, the die 31 of the swage device 10 is configured with a correspondingly shaped slot 32 that mates with the swage anvil 14 and allows lateral translation of the swage anvil 14 within the slot 32.

As indicated above, lateral translation of swage anvil 14 along a direction that is substantially parallel to the long axis 33 of the saw blade 34 causes the anvil 14 to contact the saw blade tooth and provides support to the top rear surface 48 of the saw blade tooth 50 along two axes (e.g., an x-axis and a y-axis). In certain cases, the angle 38 of the swage anvil 14 does not match the angle 52 of the tooth 50. In one arrangement, in order to adjust the angular position of the swage anvil 14 relative to the tooth 50, the swage mechanism includes an angle adjustment mechanism 90 operable to raise or lower a distal portion 91 of the swage device 10. For example, as shown in FIG. 2A, the angle adjustment mechanism 90 includes a coarse angle adjustment mechanism 92 such as formed from an adjusting screw 96 and lock nuts 98 and a fine angle adjustment mechanism 100. In use, actuation of the coarse angle adjustment mechanism 92 and the fine angle adjustment mechanism 100 raises or lowers the position of an adjustment block 102 along direction 104 relative to a guide shoe 106 of the swage device 10. Such positioning controls the angle of the entire swage device 10 relative to the long axis of the saw blade 34. While the angle of adjustment of the swage device 10 can be within any range, in one arrangement, the angle adjustment mechanism 90 provides a +/−1° angle of inclination of the swage device 10.

What is claimed is:

1. A swage device, comprising:
a frame; and
a swage anvil coupled to the frame, the swage anvil comprising
an elongate body having a first end, a second end, and a coupling portion disposed between the first end and the second end, the coupling portion being configured to couple to the frame to constrain movement of the swage anvil to lateral movement substantially parallel to a longitudinal axis of the frame, the coupling portion having a first lobe extending from the elongate body along a first direction from a centerline of the swage anvil and extending between the first end and the second end of the elongate body, the elongate body and the coupling portion defining a tooth contact face extending between the first end and the second end, the tooth contact face defining an angle relative to a long axis of the elongate body, the tooth contact face being configured to abut a top rear surface of a saw blade tooth and the tooth contact face being configured to support the saw blade tooth during a swaging procedure performed on that saw blade tooth;

wherein the tooth contact face defines a tip overhang portion configured to extend beyond a tip of the saw blade tooth in the same plane as the tooth contact face when the tooth contact face abuts the top rear surface of the tooth; and wherein the elongate body is configured as a wedge-shaped elongate body, the second end of the wedge-shaped elongate body being thicker than the first end of the wedge-shaped elongate body.

2. The swage device of claim 1, wherein the coupling portion comprises:

a second lobe extending from the elongate body along a second direction from the centerline of the swage anvil, the second direction opposing the first direction, and extending between the first end and the second end of the elongate body.

3. The swage device of claim 1, wherein tooth contact face defines a rear overhang portion configured to extend beyond the top rear surface of the saw blade tooth when the tooth contact face abuts the top rear surface of the saw blade tooth.

4. The swage device of claim 3, wherein the rear overhang portion defines a substantially curved portion configured to extend beyond the top rear surface of the saw blade tooth when the tooth contact face abuts the top rear surface of the saw blade tooth.

5. The swage device of claim 1 wherein the tooth contact face defines an angle of between about eight degrees relative to the coupling portion surface of the elongate body and about sixteen degrees relative to the coupling portion surface of the elongate body.

6. The swage device of claim 1, further comprising:

an eccentric swaging die coupled to the frame, the eccentric swaging die opposing the swage anvil; and a set of saw blade clamps coupled to the frame, the set of saw blade clamps disposed in proximity to the eccentric swaging die and the swage anvil.

7. The swage device of claim 6, further comprising a die coupled to the frame, the die defining a slot configured to receive the coupling portion of the swage anvil to couple the swage anvil to the frame, the slot being sized and shaped to mirror a size and shape of the coupling portion of the swage anvil, the size and shape of the slot defined by the die and the size and shape of the coupling portion of the swage anvil being configured to constrain movement of the swage anvil to lateral movement of the swage anvil relative to a longitudinal axis of the frame.

8. The swage device of claim 7, further comprising a positioning device coupled to the die and substantially parallel to a longitudinal axis of the frame, the positioning device configured to position the swage anvil longitudinally within the slot defined by the die and to secure the die to the frame.

9. The swage device of claim 8, wherein the swage anvil is disposed at a proximal end of the swage device and further comprising an angle adjustment mechanism and a guide shoe disposed at a distal end of the swage device, the distal end opposing the proximal end of the swage device, the angle adjustment mechanism configured to adjust an angular position of the tooth contact face of the swage anvil relative to the guide shoe of the swage device.

10. The swage device of claim 9, wherein the angle adjustment mechanism comprises a coarse angle adjustment mechanism and a fine angle adjustment mechanism, the coarse angle adjustment mechanism and the fine angle adjustment mechanism being configured to adjust a position of the distal portion of the swage device and the angular position of the tooth contact face of the swage anvil relative to the guide shoe of the swage device.

11. A swage anvil, comprising:

an elongate body having a first end, a second end, and a coupling portion disposed between the first end and the second end, the coupling portion being configured to couple to a swage device to constrain movement of the swage anvil to lateral movement substantially parallel to a longitudinal axis of the swage device, the coupling portion having a first lobe extending from the elongate body along a first direction from a centerline of the swage anvil and extending between the first end and the second end of the elongate body; and the elongate body and the coupling portion defining a tooth contact face extending between the first end and the second end, the tooth contact face defining an angle relative to a coupling portion surface of the elongate body, the tooth contact face being configured to abut a top rear surface of a saw blade tooth and the tooth contact face being configured to support the saw blade tooth during a swaging procedure performed on that saw blade tooth;

wherein the tooth contact face defines a tip overhang portion configured to extend beyond a tip of the saw blade tooth in the same plane as the tooth contact face when the tooth contact face abuts the top rear surface of the saw blade tooth;

wherein the elongate body is configured as a wedge-shaped elongate body, the second end of the wedge-shaped elongate body being thicker than the first end of the wedge-shaped elongate body.

12. The swage anvil of claim 11, wherein the coupling portion comprises:

a second lobe extending from the elongate body along a second direction from the centerline of the swage anvil, the second direction opposing the first direction, and extending between the first end and the second end of the elongate body.

13. The swage anvil of claim 11, wherein the tooth contact face defines a rear overhang portion configured to extend beyond the top rear surface of the saw blade tooth when the tooth contact face abuts the top rear surface of the saw blade tooth.

14. The swage anvil of claim 13, wherein the rear overhang portion defines a substantially curved portion configured to extend beyond the top rear surface of the saw blade tooth when the tooth contact face abuts the top rear surface of the saw blade tooth.

15. The swage anvil of claim 11 wherein the tooth contact face defines an angle of between about eight degrees relative to the coupling portion surface of the elongate body and about sixteen degrees relative to the coupling portion surface of the elongate body.

* * * * *